United States Patent
Kanamarlapudi et al.

(10) Patent No.: US 12,250,143 B2
(45) Date of Patent: Mar. 11, 2025

(54) QOS FLOW FRAMEWORK

(71) Applicant: QUALCOMM Incorporated, San Diego, CA (US)

(72) Inventors: Sitaramanjaneyulu Kanamarlapudi, San Diego, CA (US); Prashanth Haridas Hande, San Diego, CA (US); Dario Serafino Tonesi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/664,639

(22) Filed: May 23, 2022

(65) Prior Publication Data

US 2023/0379241 A1  Nov. 23, 2023

(51) Int. Cl.
  *H04L 45/302* (2022.01)
  *H04L 45/00* (2022.01)
  *H04L 45/12* (2022.01)

(52) U.S. Cl.
  CPC .......... *H04L 45/302* (2013.01); *H04L 45/123* (2013.01); *H04L 45/38* (2013.01)

(58) Field of Classification Search
  CPC ..... H04L 45/123; H04L 45/302; H04L 45/38; H04L 65/80; H04W 28/0268; H04W 28/0967
  See application file for complete search history.

(56) References Cited

U.S. PATENT DOCUMENTS

| | | | |
|---|---|---|---|
| 11,240,157 B1 * | 2/2022 | Callaghan | H04L 69/22 |
| 2004/0236866 A1 * | 11/2004 | Dugatkin | H04L 41/142 709/224 |
| 2019/0320362 A1 * | 10/2019 | Liu | H04W 28/0263 |
| 2019/0325227 A1 * | 10/2019 | Smith | H04N 21/631 |
| 2019/0327658 A1 * | 10/2019 | Han | H04W 36/0044 |
| 2020/0053596 A1 * | 2/2020 | Huang-Fu | H04W 76/11 |
| 2020/0280871 A1 * | 9/2020 | Khirallah | H04W 28/0257 |
| 2021/0058819 A1 * | 2/2021 | Ozturk | H04W 28/0263 |
| 2022/0141146 A1 * | 5/2022 | Fu | H04L 47/28 370/236 |

(Continued)

FOREIGN PATENT DOCUMENTS

WO   2020011375 A1   1/2020

OTHER PUBLICATIONS

CATT: "New Solution for KI#4/5: Sub-QoS Flow Based QoS Architecture and Policy Control", 3GPP TSG-WG SA2 Meeting #150E e-meeting, S2-2202715, Mar. 29, 2022, Elbonia, Apr. 6-14, 2022, XP052133549, 9 Pages, Sec. 1, figure 1 Sec. 2 Sec. 2.1 Sec. 3.2 Sec. 3.3.

(Continued)

*Primary Examiner* — Jeong S Park
(74) *Attorney, Agent, or Firm* — Procopio, Cory, Hargreaves & Savitch LLP

(57) ABSTRACT

Apparatus, methods, and computer program products for processing QoS flows are provided. An example method may include establishing a PDU session with a second device, the PDU session including a set of QoS flows, the set of QoS flows being associated with a set of DRBs. The example method may further include communicating with the second device based on the set of QoS flows.

21 Claims, 12 Drawing Sheets

(56) References Cited

U.S. PATENT DOCUMENTS

2023/0269620 A1\* 8/2023 Rossbach .............. H04W 76/10
 370/329
2024/0244480 A1\* 7/2024 Tano ................ H04W 28/0278

OTHER PUBLICATIONS

International Search Report and Written Opinion—PCT/US2023/016712—ISA/EPO—Jun. 14, 2023.
Lenovo: "Provision XR Traffic Configuration to 5GS", TSG SA WG2 Meeting #151E, S2-2204214, May 16-20, 2022, Electronic meeting, May 6, 2022, XP052159717, 5 Pages, the whole document.

\* cited by examiner

QOS FLOW FRAMEWORK

TECHNICAL FIELD

The present disclosure relates generally to communication systems, and more particularly, to wireless communication systems with quality of service (QoS) flows.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first device are provided. The apparatus may include a memory and at least one processor coupled to the memory. The memory and the at least one processor coupled to the memory may be configured to establish a protocol data unit (PDU) session with a second device, the PDU session including a set of quality of service (QoS) flows, the set of QoS flows being associated with a set of data radio bearers (DRBs), each QoS flow in the set of QoS flows being associated with multiple QoS identifier parameters to provide different QoS to different packets within a single QoS flow. The memory and the at least one processor coupled to the memory may be further configured to communicate with the second device based on the set of QoS flows.

In another aspect of the disclosure, a method, a computer-readable medium, and an apparatus at a first device are provided. The apparatus may include a memory and at least one processor coupled to the memory. The memory and the at least one processor coupled to the memory may be configured to establish a PDU session with a second device, the PDU session including a set of QoS flows, the set of QoS flows being associated with a set of DRBs, where one DRB in the set of DRBs is associated with a PDCP or a RLC and associated with a first set of one or more configuration parameters based on a first QoS identifier parameter and a second set of one or more configuration parameters based on a second QoS identifier parameter. The memory and the at least one processor coupled to the memory may be further configured to communicate with the second device based on the set of QoS flows.

In another aspect of the disclosure, a method, a computer-readable medium, and an apparatus at a first device are provided. The apparatus may include a memory and at least one processor coupled to the memory. The memory and the at least one processor coupled to the memory may be configured to establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. The memory and the at least one processor coupled to the memory may be further configured to communicate with the second device based on the set of QoS flows.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
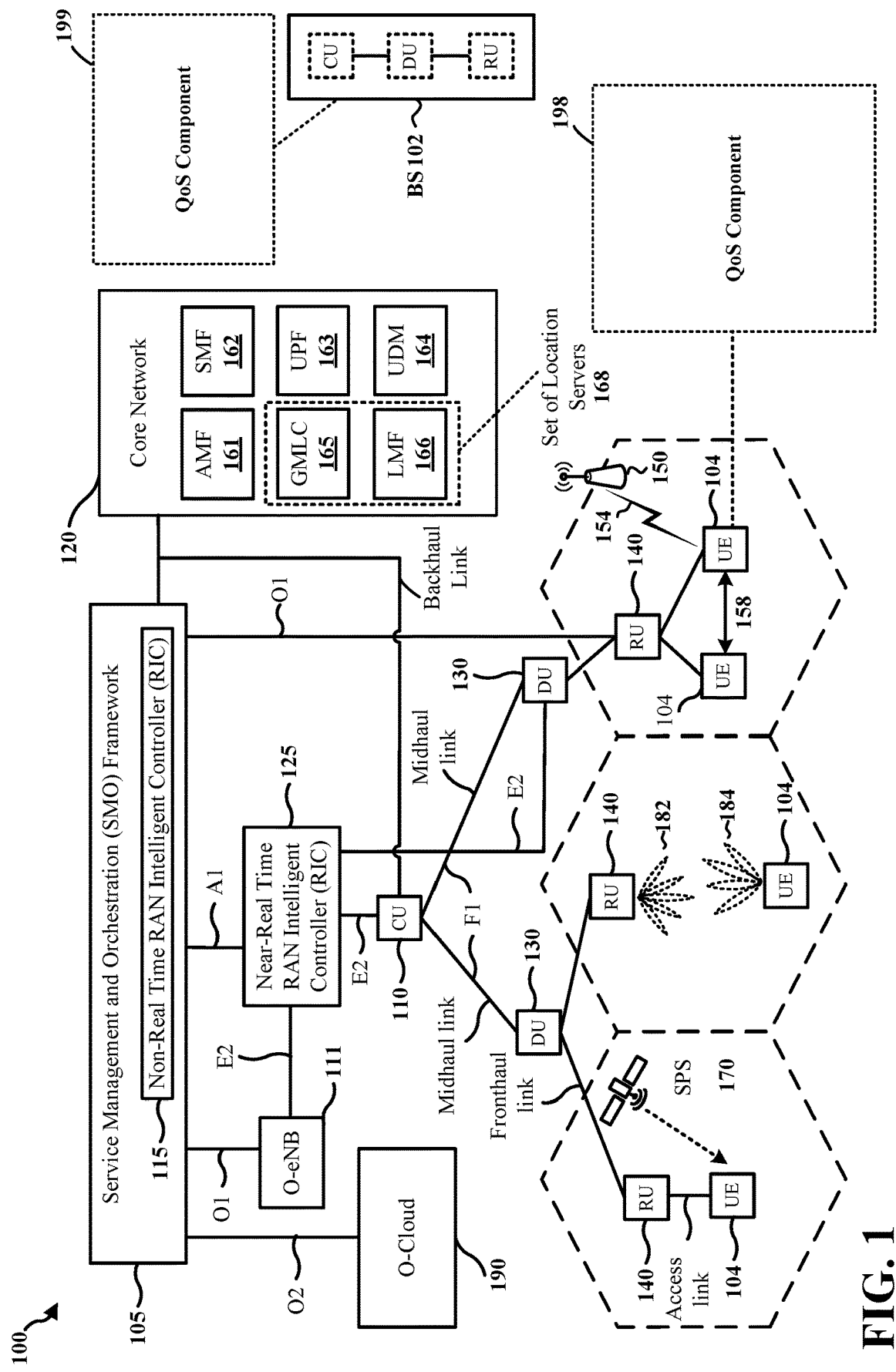
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a QoS component 198. In some aspects, the QoS component 198 may be configured to establish a protocol data unit (PDU) session with a second device, the PDU session including a set of quality of service (QoS) flows, the set of QoS flows being associated with a set of data radio bearers (DRBs), each QoS flow in the set of QoS flows being associated with multiple QoS identifier parameters to provide different QoS to different packets within a single QoS flow. In some aspects, the QoS component 198 may be configured to establish a PDU session with a second device, the PDU session including a set of QoS flows, the set of QoS flows being associated with a set of DRB s, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the QoS component 198 may be configured to establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the QoS component 198 may be configured to communicate with the second device based on the set of QoS flows.

In certain aspects, the base station 102 may include a QoS component 199. In some aspects, the QoS component 199 may be configured to establish a PDU session with a second device, the PDU session including a set of QoS flows, the set of QoS flows being associated with a set of DRBs, each QoS flow in the set of QoS flows being associated with multiple QoS identifier parameters to provide different QoS to different packets within a single QoS flow. In some aspects, the QoS component 199 may be configured to establish a PDU session with a second device, the PDU session including a set of QoS flows, the set of QoS flows being associated with a set of DRBs, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the QoS component 199 may be configured to establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the QoS component 199 may be configured to communicate with the second device based on the set of QoS flows.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
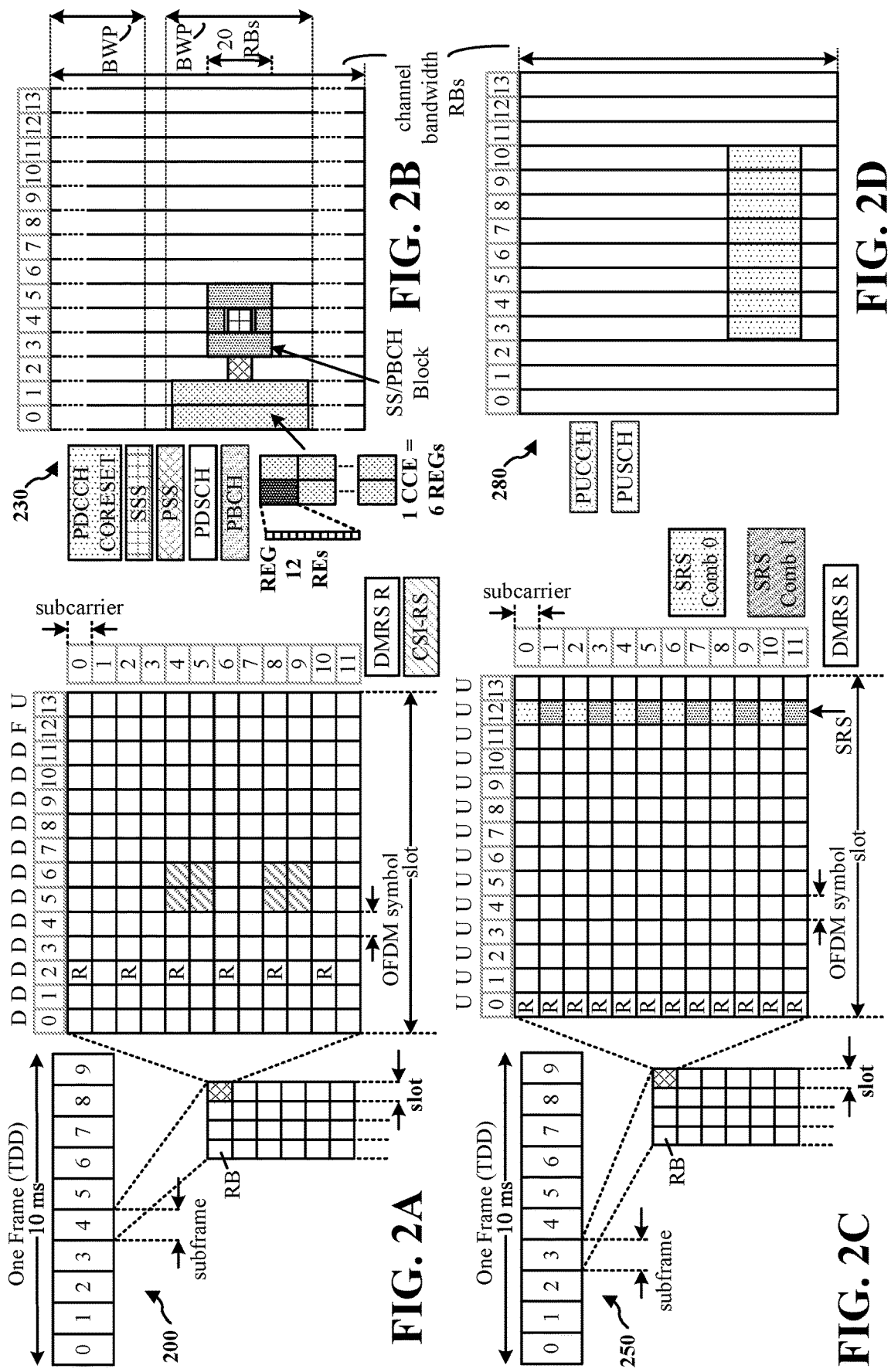
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
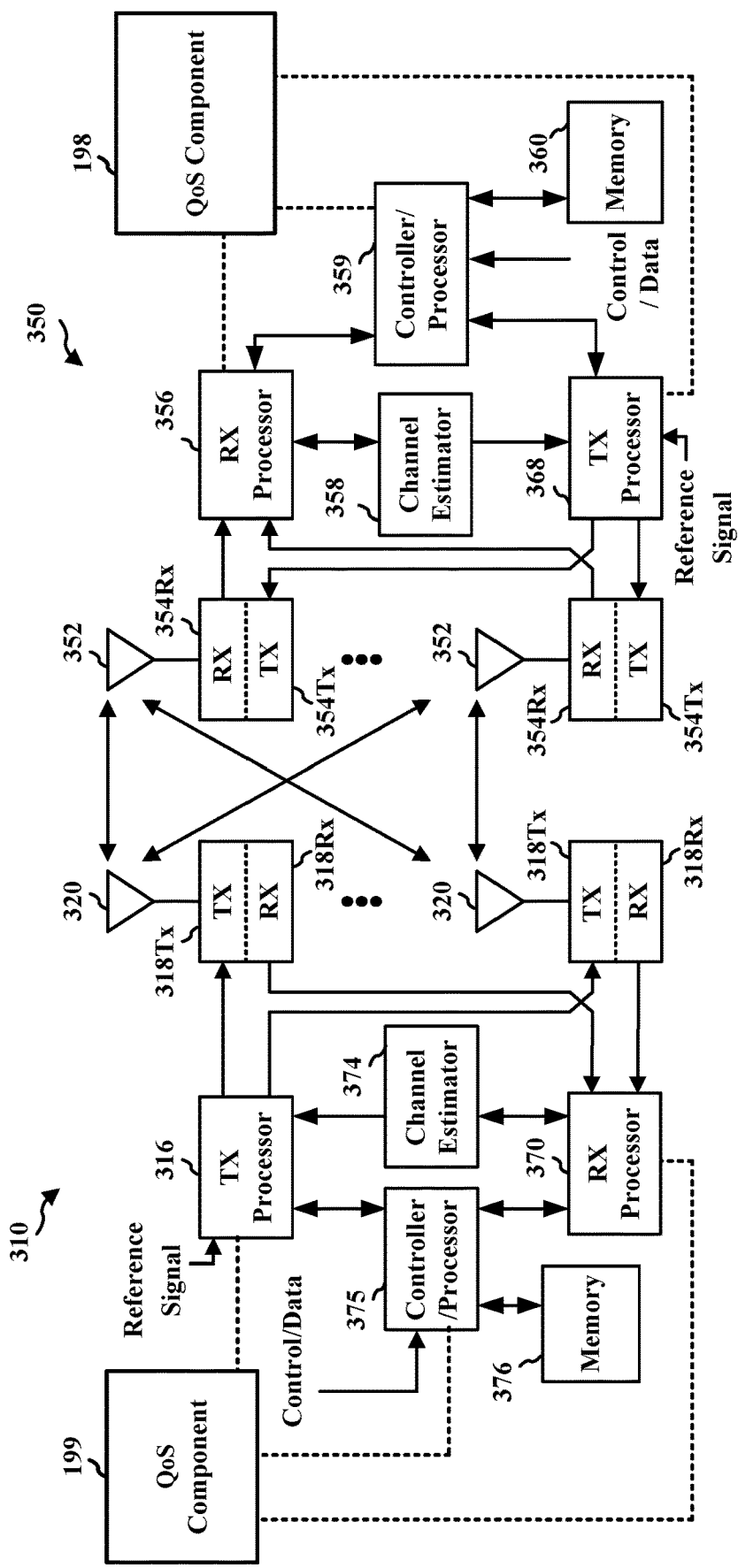
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with QoS component 198 of FIG. 1.

At least one of the TX processor 316, the RX processor 370, and the controller/processor 375 may be configured to perform aspects in connection with QoS component 199 of FIG. 1.

As used herein, the term "application data unit (ADU)", the term "PDU set", and the term "set of PDUs," a "chunk," or other similar terms may be used interchangeably and may be used to refer to a minimum data unit that may be exchanged between a network and a user equipment for an application, e.g., a granularity at an application level. In order to illustrate the concept, in a non-limiting example, the application may be for a user head mounted device (HMD), such as an extended reality (XR) application (e.g., an augmented reality (AR) application, a virtual reality (VR) application, or mixed reality (MR) application. In such an example, the ADU may be a minimum unit that is sent between the network and the HMD for the XR application. The ADU may be associated with rendering of one or more frames, the one or more frames may have different coding mechanisms (e.g., based on the underlying protocol and a frame refresh rate). In some aspects, XR traffic may be time sensitive and packet loss sensitive because the XR traffic may be associated with visual or audio information that may be subject to a timeline (e.g., based on the one or more frames) and completeness (e.g., completeness of the one or more frames). Aspects provided herein may enable ADUs to be delivered accurately and timely. The aspects presented herein are not limited to XR applications, and other example applications may include differential QOS specification across the flows, packets, applications, radio configurations.

As used herein, the term "data radio bearer (DRB)" may refer to any radio bearer, which includes data radio bearer or multicast/broadcast radio bearer or signaling radio bearer. A radio bearer that may define packet treatment on a radio interface. As used herein, the term "quality of service (QoS)" may refer to the measurement of the overall performance of a service experienced by the users of the network. QoS may be enforced at the QoS flow level. In some aspects, each QoS flow packets are classified and marked (e.g., using QoS flow identifier (QFI) which may be carried in an encapsulation header over N3). In some aspects, the QoS flow classification (which may also be called type) may be associated with guaranteed flow bit rate, no specified guaranteed flow bit rate, mission critical guaranteed flow bit rate, or the like. In some aspects, a DL or UL PDU session information frame may include a QFI field for each packet. The QoS Flow may be a finest granularity of QoS differentiation in the PDU Session. A QFI may be used to identify a QoS Flow. User Plane traffic with a same QFI within a PDU Session may be associated with a same traffic forwarding treatment (e.g. scheduling weights, admission thresholds, queue management thresholds, link layer protocol configuration, or the like). The QFI may be carried in an encapsulation header on N3 (and N9) e.g., without any changes to the e2e packet header. QFI may be used for all PDU Session Types. The QFI may be unique within a PDU Session. The QFI may be dynamically assigned or may be equal to the 5QI. In some aspects, the QoS identifier may be the same as or correspond to a 5QI.

ADUs may be associated with forward error correction (FEC) information. Such FEC information may be used for correcting one or more missing bits in the ADUs. For example, while the ADU is transmitted over a radio network, the ADU may go through various radio protocols for successful delivery. The various radio protocols may include PDCP, RLC, and HARQ based PHY layer transmissions. For example, packetization of the ADUs may be performed based on PDCP, segmentation and retransmission of the ADUs may be performed based on RLC, and redundancy of the ADUs may be based on HARQ. ADUs may be transmitted in a PDU session that may include one or more QoS flows.

In some aspects, QoS identifier (which may also be referred to as "5QI") parameters may be configured by a network to provide a mapping of QoS flows to data radio bearers (DRBs). In some aspects, a set of 5QI parameters may be associated with an 5QI which may be a pointer to a set of QoS characteristics such as resource type (e.g., representing if dedicated network resources related to a QoS Flow-level Guaranteed Flow Bit Rate (GFBR) value are permanently allocated (e.g. by an admission control function in a radio base station), priority level, packet delay or packet error rate, averaging window, maximum data burst volume, or the like. The set of 5QI parameters may include access node-specific parameters that control QoS transmission (e.g., forwarding) treatment for the QoS flow (e.g. scheduling weights, admission thresholds, queue management thresholds, link layer protocol configuration, discard timer, reordering timer, reassembly timer, retransmission timer, or the like). In some aspects, an ADU may belong to one flow and each flow may have at least one QoS Rule matching to map the packets from the given flow onto a DRB. The filter rule matched may be specific to the flow or a match-all filter (filter not specific to the flow but applicable to a set of flows, such as all flows), so that packets may be routed to a respective DRB. Each DRB may be mapped to a logical channel with an associated priority to be able to transmit based on per logical channel prioritization (LCP) rules in MAC TB UL.

Figure 4:
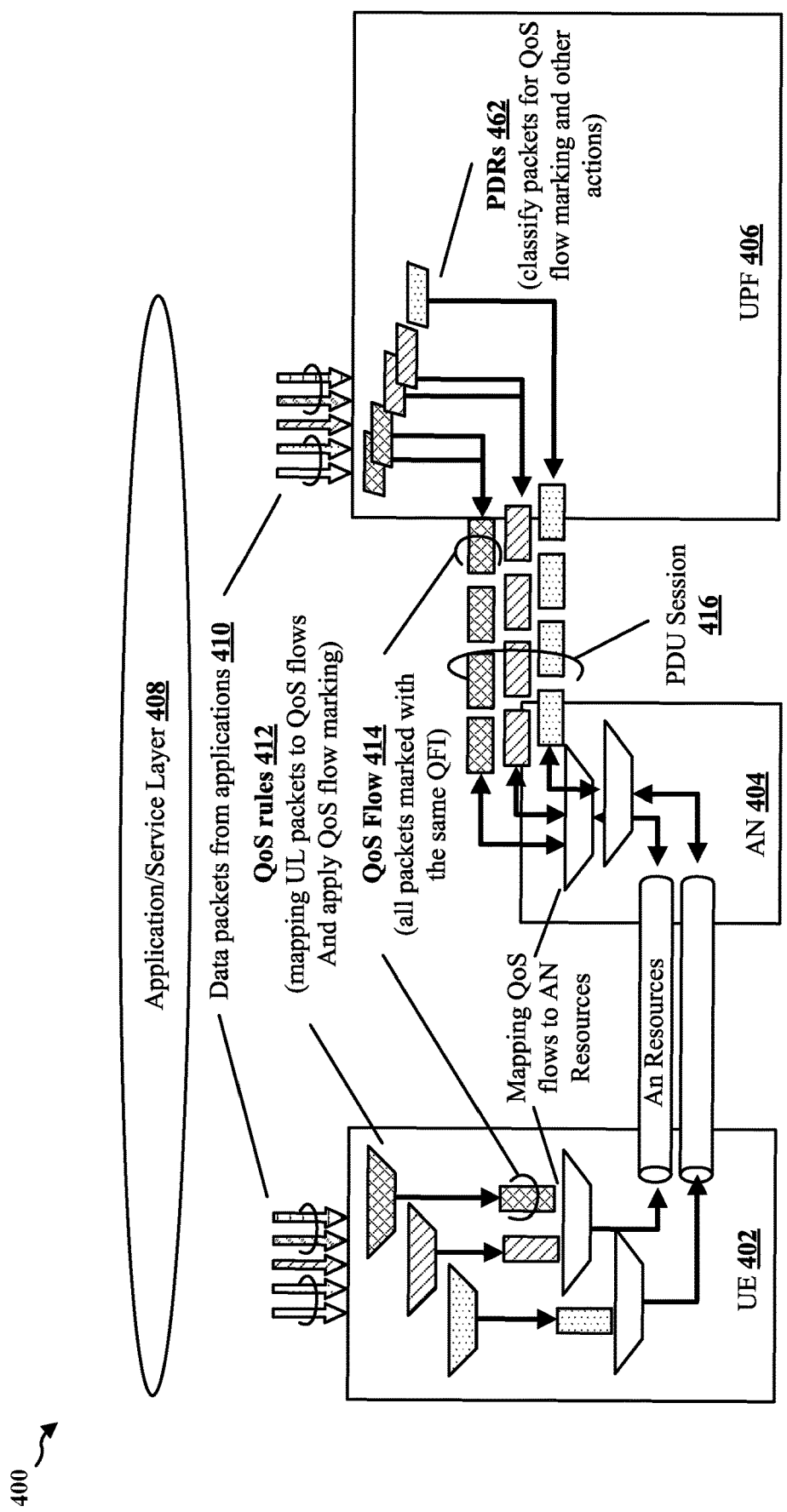
FIG. 4 is a diagram illustrating example mapping of traffic flows onto data radio bearer (DRB).

FIG. 4 is a diagram 400 illustrating example mapping of traffic flows onto DRB. As illustrated in FIG. 4, an application/service layer 408 may provide data packets 410 to a user plane function (UPF) 406 or a UE 402. To exchange the data packets 410 (e.g., DL packets in the data packets 410), the UPF 406 may perform packet detection based on packet detection rule (PDR) 462 and may accordingly classify the data packets 410 for QoS flow marking. The PDR 462 may also include pointers to forwarding action rules (FAR), QoS enforcement rules (QER), usage reporting rules (URR), or buffering action rules (BAR). In some aspects, the QoS flow marking may create different classifications of service for different kinds of network traffic. In some aspects, the QoS flow marking may include changing a field within a packet at layer 2 or layer 3. In some aspects, the UPF 406 may mark the packets in the data packets 410 onto one or more different QoS flows 414. In some aspects, an SMF may provide a RAN with QFI and QoS profile and may provide the UPF 406 with information enabling classification, bandwidth enforcement and marking of User Plane traffic such as a DL PDR containing the DL part of the SDF template and an UL PDR containing the UL part of the SDF template, the PDR precedence value, QoS related information, the corresponding packet marking information, or Reflective QoS Indication.

In some aspects, the UPF 406 may establish a PDU session 416 with an access network (AN) 404 to exchange the data packets with the UE 402. In some aspects, to exchange the data packets 410, the UE 402 may map one or more UL packets in the data packets 410 to one or more QoS flows 414 and apply QoS flow marking based on a set of QoS rules 412. In some aspects, the UE may also map the one or more QoS flows 414 to AN resources of the AN 404. In some aspects, the AN 404 may map the one or more QoS flows 414 to the AN resources of the AN 404. The SMF may generate the set of QoS rules rule 412 and provide to the UE 402 (e.g., by generating a QoS rule for each service data flow (SDF) that may be mapped to the one or more QoS flows 414) with: a QoS rule identifier, QFI in the QoS rule is set to the QFI of the QoS Flow to which the policy and charging control (PCC) rule is bound, the Packet Filter Set of the QoS rule generated from the UL SDF filters or the DL SDF filters of the PCC rule, the QoS rule precedence value set to the precedence value of the PCC rule for which the QoS rule is generated, QoS Flow level QoS parameters, or the like.

Figure 5:
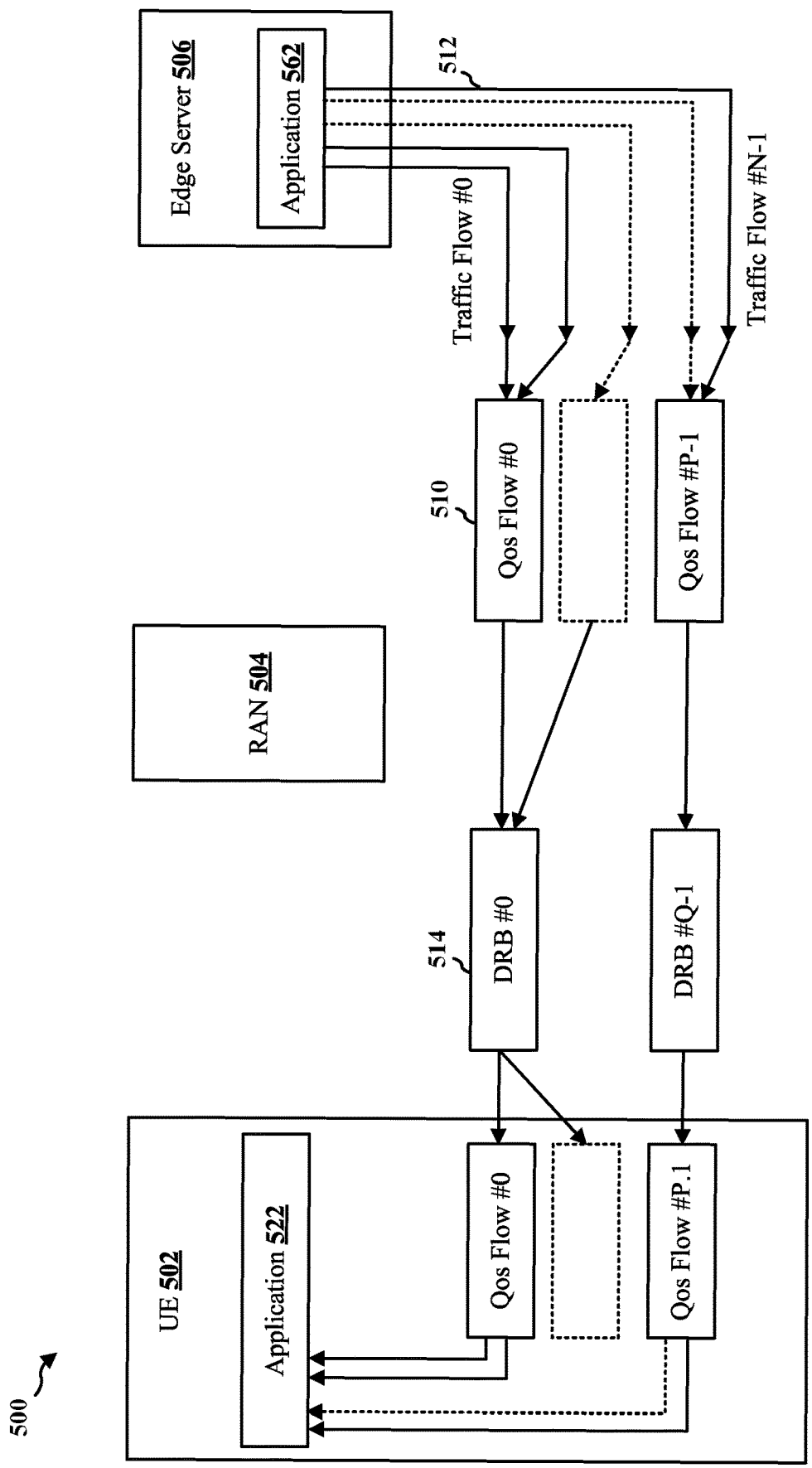
FIG. 5 is a diagram illustrating example mapping of DL traffic onto DRB.

In some wireless communication systems, one QoS flow may be mapped onto one DRB and several QoS flows may be mapped onto a same DRB. FIG. 5 is a diagram 500 illustrating example mapping of DL traffic onto DRB. As illustrated in FIG. 5, an edge server 506 associated with an application 562 may provide data in a set of traffic flows 512 to a radio access network (RAN) 504. The set of traffic flows 512 may be mapped to a set of QoS flows 510 (e.g., by the RAN 504). The set of QoS flows 510 may be further mapped to a set of DRBs 514. In some aspects, one QoS flow may be mapped onto one DRB and several QoS flows may be mapped onto a same DRB. A UE 502 may receive the data in the set of QoS flows 510 based on the set of DRBs 514 and may use that data in an application 522. For example, the application 522 may include video or audio playback and the data may be video or audio data.

Figure 6:
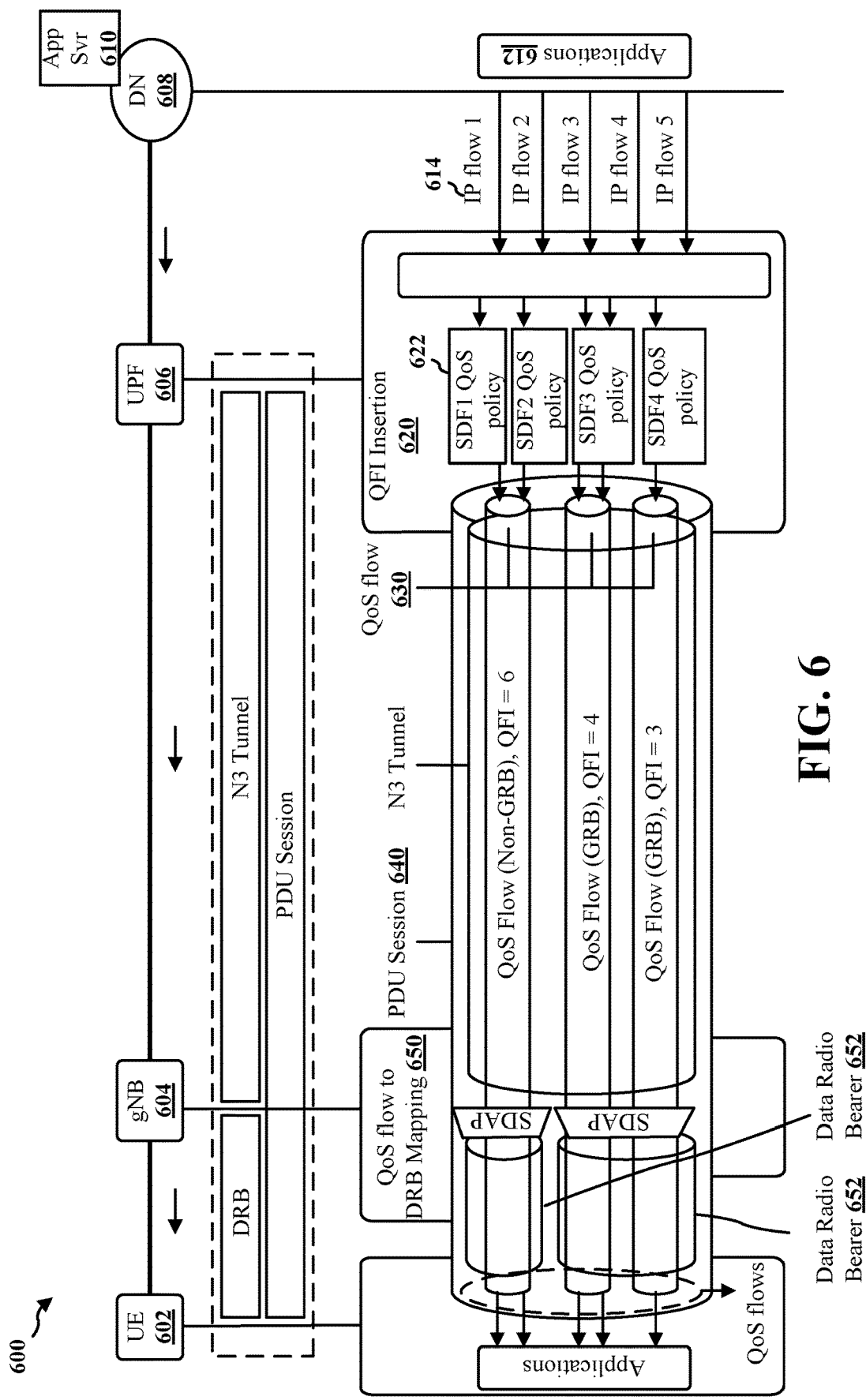
FIG. 6 is a diagram illustrating example quality of service (QoS) flow differentiation within a protocol data unit (PDU) session.

FIG. 6 is a diagram 600 illustrating example QoS flow differentiation within a PDU session. As illustrated in FIG. 6, an application server 610 associated with a data network (DN) 608 may transmit data to a UPF 606 via one or more IP flows 614. The one or more IP flows 614 may be associated with one or more applications 612. The UPF 606 may perform packet detection and classify data in the one or more IP flows 614 to a set of QoS flows 630 based on QFI insertion 620 (which may correspond with marking).

A set of SDF policy 622 may be associated the different QoS flows 630. The UPF 606 may transmit the data in the set of QoS flows 630 based on a PDU session 640 to a gNB 604. The gNB 604 may map the set of QoS flows 630 to a set of DRBs 652 at 650. Based on the set of DRBs 652, data in the set of QoS flows 630 may be transmitted from the gNB 604 to a UE 602. The data in the set of QoS flows 630 may be used for applications on the UE 602 (which may correspond with applications associated with the applications 612).

In some wireless communication systems, 5QI parameters may be configured per flow either explicitly for a given flow or through default rule. As the rule is fixed for the given flow, all the traffic on the flow may be treated with, or provided with, the same QOS. For example, in UL, for a PDU Session of Type IP or Ethernet, the UE may evaluate UL packets against the UL Packet Filters in the Packet Filter Set in the QoS rules based on a precedence value of QoS rules in increasing order until a matching QoS rule (i.e. whose Packet Filter matches the UL packet) is found or discard the UL data packet if no matching QoS rule is found. For a PDU Session of Type Unstructured, the default QoS rule does not contain a Packet Filter Set and all UL packets may be allowed. More than one QoS flow may be mapped to one DRB. A mapping between QoS flows to RB characteristics may be fixed at the RB level, and all flows may receive a same forwarding treatment.

In some wireless communication systems, 5QI parameters may match to the incoming packet based on protocol content (e.g., which may be referred to as a 5-tuple). In some aspects, 5-tuple may refer to a set of values for a Transmission Control Protocol/Internet Protocol (TCP/IP) connection. For example, 5-tuple may include a source IP address/ port number, a destination IP address/port number, and the protocol in use. When there are different types of packets flowing through a same QoS flow (e.g., for an XR application for different frames) with varying significance (e.g., and associated specification on latency, reliability, or the like) and varying coding specifications (e.g., different FEC), aspects provided herein may enable different packets within a single QoS flow to be provided with different QoS. The flexibility in QoS for different packets of a single QoS flow may improve a user experience with the application.

Figure 7:
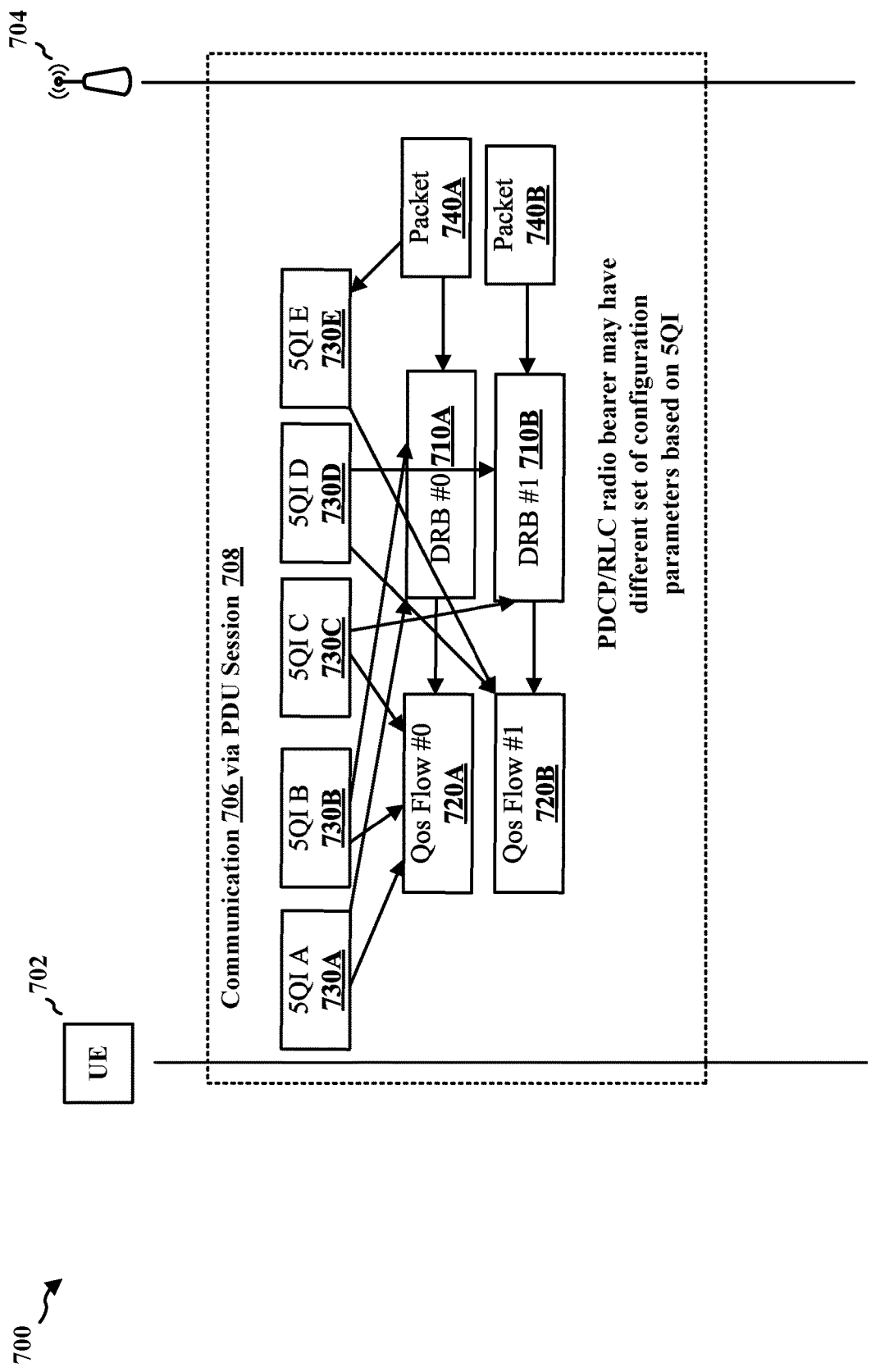
FIG. 7 is a diagram illustrating example communications between a first device and a second device.

FIG. 7 is a diagram 700 illustrating example communications between a first device and a second device. In some aspects, the first device may be the UE 702. In some aspects, the second device may be the network entity 704. The network entity may be a network node. In some aspects, the network entity 704 may be a base station that may be implemented as an aggregated base station, as a disaggregated base station, an integrated access and backhaul (IAB) node, a relay node, a sidelink node, or the like. A network entity may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, the network entity may be part of the Terrestrial or Non-Terrestrial Network or combination of.

As illustrated in FIG. 7, the UE 702 may establish a PDU session 708 with the network entity 704 and may exchange communication 706 accordingly. In some aspects, the PDU session 708 may include one or more QoS flows such as QoS flow 720A and QoS flow 720B, as described in connection with FIGS. 4-6. In some aspects, each QoS flow may be associated with (e.g., have) multiple sets of 5QI parameters based on what kind of traffic patterns are expected on that QoS flow. Each set of 5QI parameters may include access node-specific parameters that control QoS transmission (e.g., forwarding) treatment for the QoS flow (e.g. scheduling weights, admission thresholds, queue management thresholds, link layer protocol configuration, discard timer, reordering timer, reassembly timer, retransmission timer, or the like).

As an example, the QoS flow 720A may be associated with 5QI parameters set A 730A and 5QI parameters set B 730B. The QoS flow 720B may be associated with 5QI parameters set D 730D and 5QI parameters set E 730E. In some aspects, multiple packets on the same QoS flow which may or may not have inter-dependencies and may belong to various sub-streams at application level.

In some aspects, each of the one or more QoS flows such as the QoS flow 720A or the QoS flow 720B may be mapped to a DRB such as the DRB 710A or the DRB 710B. In some aspects, each 5QI associated with 5QI parameters such as the 5QI parameters set A 730A, the 5QI parameters set B 730B, and the 5QI parameters set C 730C that belongs to a QoS flow may be mapped to a same DRB or different DRB (e.g., based on inter-packet dependencies on the QoS flow). The terms "inter-packet dependencies" and "inter-packet association" may be used interchangeably and may refer to an association based on association of data in the packets. For example, packets carrying video data or audio data that are related and defined to be associated (e.g., as part of one video/audio playback) may have inter-packet association or inter-packet dependency. For example, the 5QI parameters set A 730A and the 5QI parameters set B 730B which belong to the QoS flow 720A may be mapped to the DRB 710A. The 5QI parameters set C 730C which also belong to the QoS flow 720A may be mapped to the DRB 710B.

In some aspects, PDCP or RLC Radio bearer associated with each of the DRB 710A or the DRB 710B, may have different set of configuration parameters based on the type of 5QI. For example, for 5QI parameters set A 730A, the DRB 710A may have a UL PDCP Discard timer of 100 ms, a DL PDCP reordering timer of 180 ms, a DL RLC Reassembly timer of 40 ms, and a UL RLC Poll Retransmission timer of 40 ms. For 5QI parameters set B 730B, the DRB 710A may have a UL PDCP Discard timer of 50 ms, a DL PDCP reordering timer of 80 ms, a DL RLC Reassembly timer of 20 ms, and a UL RLC Poll Retransmission timer of 20 ms.

In some aspects, each packet in the communication 706 may be mapped to bearer based on protocol content (e.g., 5-tuple) or traffic characteristics to identify a matching 5QI (and associated 5QI parameters and associated bearer (e.g., DRB)). For example, packet 740A may be mapped to DRB 710A and packet 740B may be mapped to DRB 710B. In some aspects, the traffic characteristic may be indicated by the application or derived in a modem (e.g., a transceiver) at the UE 702 or the network entity 704. For example, an application may explicitly indicate the 5QI associated with a packet (e.g., 5QI information provided to application level logic) or a modem at the UE may choose the 5QI based on application traffic characteristics such as data transmission periodicity (e.g., cyclic/periodic transmission or acyclic/sporadic transmission) and associated statistics, period (data transmission interval at application layer) and associated statistics, application synchronized to the network time or not and associated statistics, application data size (e.g., number of ADUs) and associated statistics, data delivery guarantee (e.g., deadline, latency, bandwidth, or the like) and associated statistics, tolerance to interference, tolerance to loss, criticality, or other information that a modem may be able to obtain or determine with regard to traffic.

Figure 8:
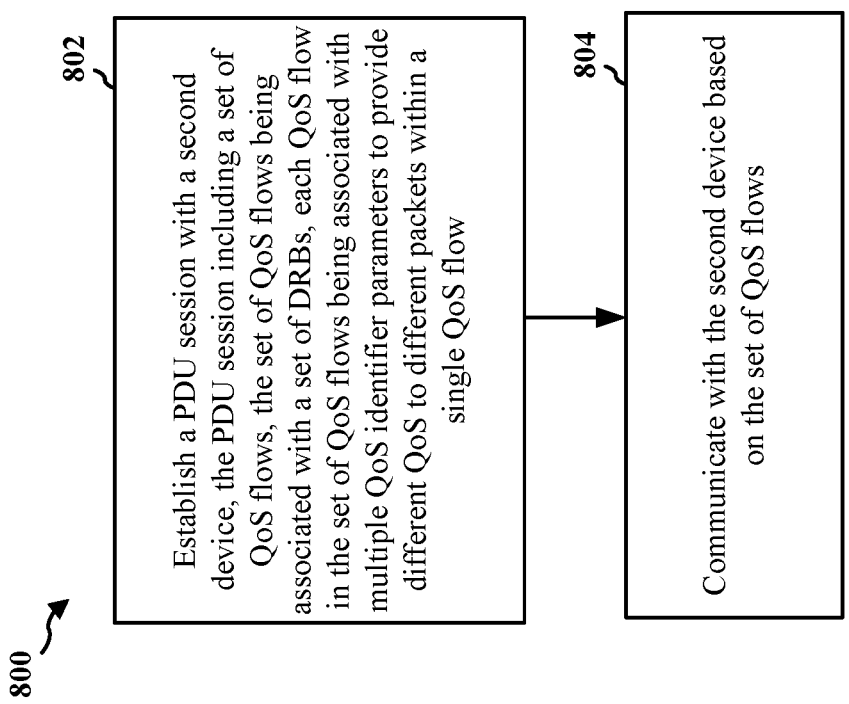
FIG. 8 is a flowchart of a method of wireless communication.

FIG. 8 is a flowchart 800 of a method of wireless communication. The method may be performed by a first device (e.g., the UE 104, the base station 102, the UE 702, the network entity 704, the apparatus 1104, the network entity 1102, the network entity 1202). The first device may be a UE or a base station. The second device may be a base station or a UE.

At 802, the first device may establish a PDU session with a second device, the PDU session including a set of QoS flows, the set of QoS flows being associated with a set of DRBs, each QoS flow in the set of QoS flows being associated with multiple QoS identifier parameters to provide different QoS to different packets within a single QoS flow. For example, the UE 702 or the network entity 704 may establish a PDU session 708 with the network entity 704 or the UE 702. In some aspects, 802 may be performed by the QoS component 198 or the QoS component 199. In some aspects, each DRB in the set of DRBs is associated with a PDCP or an RLC and associated with a first set of one or more configuration parameters based on a first QoS identifier parameter and a second set of one or more configuration parameters based on a second QoS identifier parameter. In some aspects, the first set of one or more configuration parameters includes at least one of a discard timer, a reordering timer, a reassembly timer, a status timer, a control information update timer, or a poll retransmission timer that is different than the second set of one or more configuration parameters. In some aspects, one QoS identifier parameter of the multiple QoS identifier parameters for a single QoS flow is associated with multiple DRBs in the set of DRBs. In some aspects, one QoS identifier parameter of the multiple QoS identifier parameters for a single QoS flow is associated with a single DRB in the set of DRBs based on an inter-packet association. In some aspects, each packet associated with each QoS flow of the set of QoS flows is associated with one QoS identifier parameter of the multiple QoS identifier parameters based on at least one of a set of protocol contents or a set of traffic characteristics. In some aspects, the first device may include at least one of a transceiver or an antenna coupled to the at least one processor configured to communicate with the second device, where at least one of the set of traffic characteristics or a QoS identifier parameters is provided by an application or derived at the transceiver.

At 804, the first device may communicate with the second device based on the set of QoS flows. For example, the UE 702 or the network entity 704 may communicate with the second device (e.g., the network entity 704 or the UE 702) based on the set of QoS flows. In some aspects, 804 may be performed by the QoS component 198 or the QoS component 199.

Figure 9:
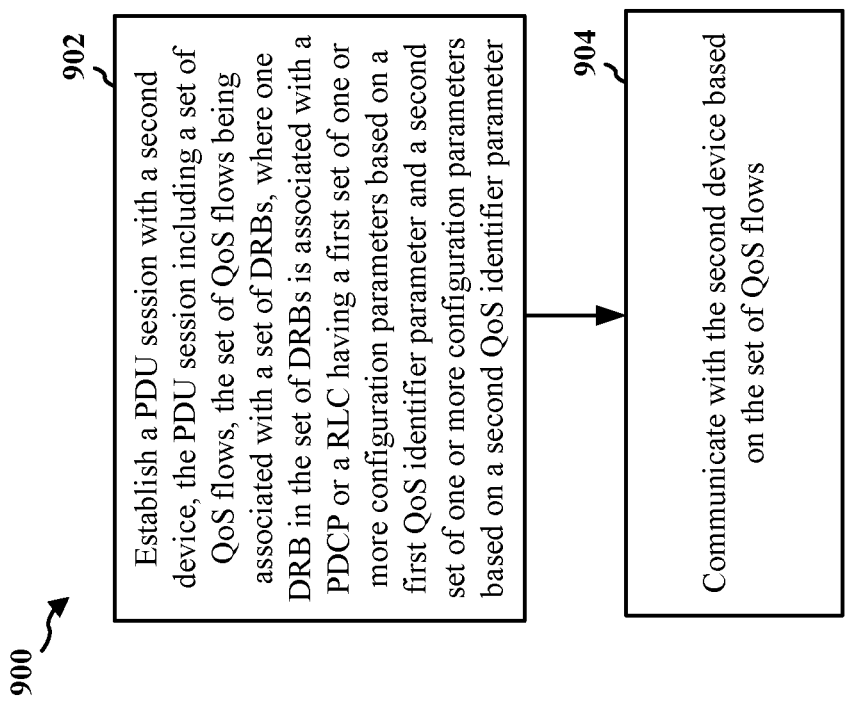
FIG. 9 is a flowchart of a method of wireless communication.

FIG. 9 is a flowchart 900 of a method of wireless communication. The method may be performed by a first device (e.g., the UE 104, the base station 102, the UE 702, the network entity 704, the apparatus 1104, the network entity 1102, the network entity 1202). The first device may be a UE or a base station. The second device may be a base station or a UE. In some aspects, each QoS flow in the set of QoS flows is associated with multiple QoS identifier parameters. In some aspects, the first set of one or more configuration parameters includes at least one of a discard timer, a reordering timer, a reassembly timer, a status timer, a control information update timer, or a poll retransmission timer that is different than the second set of one or more configuration parameters. In some aspects, each QoS flow in the set of QoS flows being associated with at least one QoS identifier parameters, and where one QoS identifier parameter of the at least one QoS identifier parameters for a single QoS flow is associated with multiple DRBs in the set of DRBs. In some aspects, each QoS flow in the set of QoS flows being associated with at least one QoS identifier parameters, and where one QoS identifier parameter of the at least one QoS identifier parameters for a single QoS flow is associated with a single DRB in the set of DRBs based on an inter-packet association. In some aspects, each packet associated with each QoS flow of the set of QoS flows is associated with one QoS identifier parameter of the multiple QoS identifier parameters based on at least one of a set of protocol contents or a set of traffic characteristics. In some aspects, the first device may include at least one of a transceiver or an antenna coupled to the at least one processor configured to communicate with the second device, where at least one of the set of traffic characteristics or a QoS identifier parameters is provided by an application or derived at the transceiver.

At 902, the first device may establish a PDU session with a second device, the PDU session including a set of QoS flows, the set of QoS flows being associated with a set of DRBs, where one DRB in the set of DRBs is associated with a PDCP or an RLC and associated with a first set of one or more configuration parameters based on a first QoS identifier parameter and a second set of one or more configuration parameters based on a second QoS identifier parameter. For example, the UE 702 or the network entity 704 may establish a PDU session 708 with the network entity 704 or the UE 702. In some aspects, 902 may be performed by the QoS component 198 or the QoS component 199.

At 904, the first device may communicate with the second device based on the set of QoS flows. For example, the UE 702 or the network entity 704 may communicate with the second device (e.g., the network entity 704 or the UE 702) based on the set of QoS flows. In some aspects, 904 may be performed by the QoS component 198 or the QoS component 199.

Figure 10:
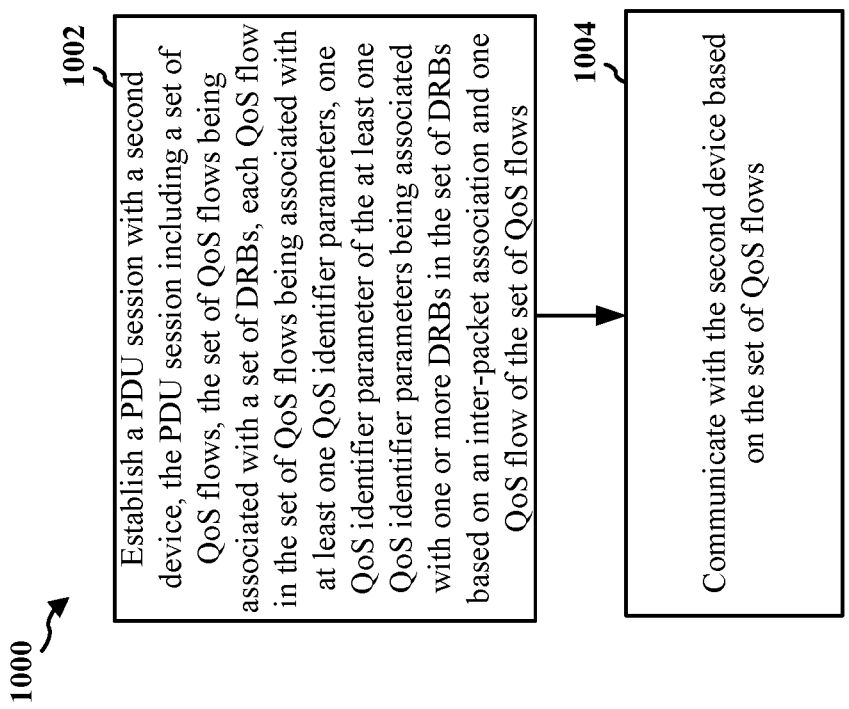
FIG. 10 is a flowchart of a method of wireless communication.

FIG. 10 is a flowchart 1000 of a method of wireless communication. The method may be performed by a first device (e.g., the UE 104, the base station 102, the UE 702, the network entity 704, the apparatus 1104, the network entity 1102, the network entity 1202). The first device may be a UE or a base station. The second device may be a base station or a UE.

At 1002, the first device may establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. For example, the UE 702 or the network entity 704 may establish a PDU session 708 with the network entity 704 or the UE 702. In some aspects, 1002 may be performed by the QoS component 198 or the QoS component 199. In some aspects, each DRB in the set of DRBs is associated with a PDCP or an RLC and associated with a first set of one or more configuration parameters based on a first QoS identifier parameter and a second set of one or more configuration parameters based on a second QoS identifier parameter. In some aspects, the first set of one or more configuration parameters includes at least one of a discard timer, a reordering timer, a reassembly timer, a status timer, a control information update timer, or a poll retransmission timer that is different than the second set of one or more configuration parameters. In some aspects, each QoS flow in the set of QoS flows is associated with multiple QoS identifier parameters. In some aspects, each packet associated with each QoS flow of the set of QoS flows is associated with one QoS identifier parameter of the multiple QoS identifier parameters based on at least one of a set of protocol contents or a set of traffic characteristics. In some aspects, the first device may further include at least one of a transceiver or an antenna coupled to the at least one processor configured to communicate with the second device, where at least one of the set of traffic characteristics or a QoS identifier parameters is provided by an application or derived at the transceiver.

At 1004, the first device may communicate with the second device based on the set of QoS flows. For example, the UE 702 or the network entity 704 may communicate with the second device (e.g., the network entity 704 or the UE 702) based on the set of QoS flows. In some aspects, 1004 may be performed by the QoS component 198 or the QoS component 199.

Figure 11:
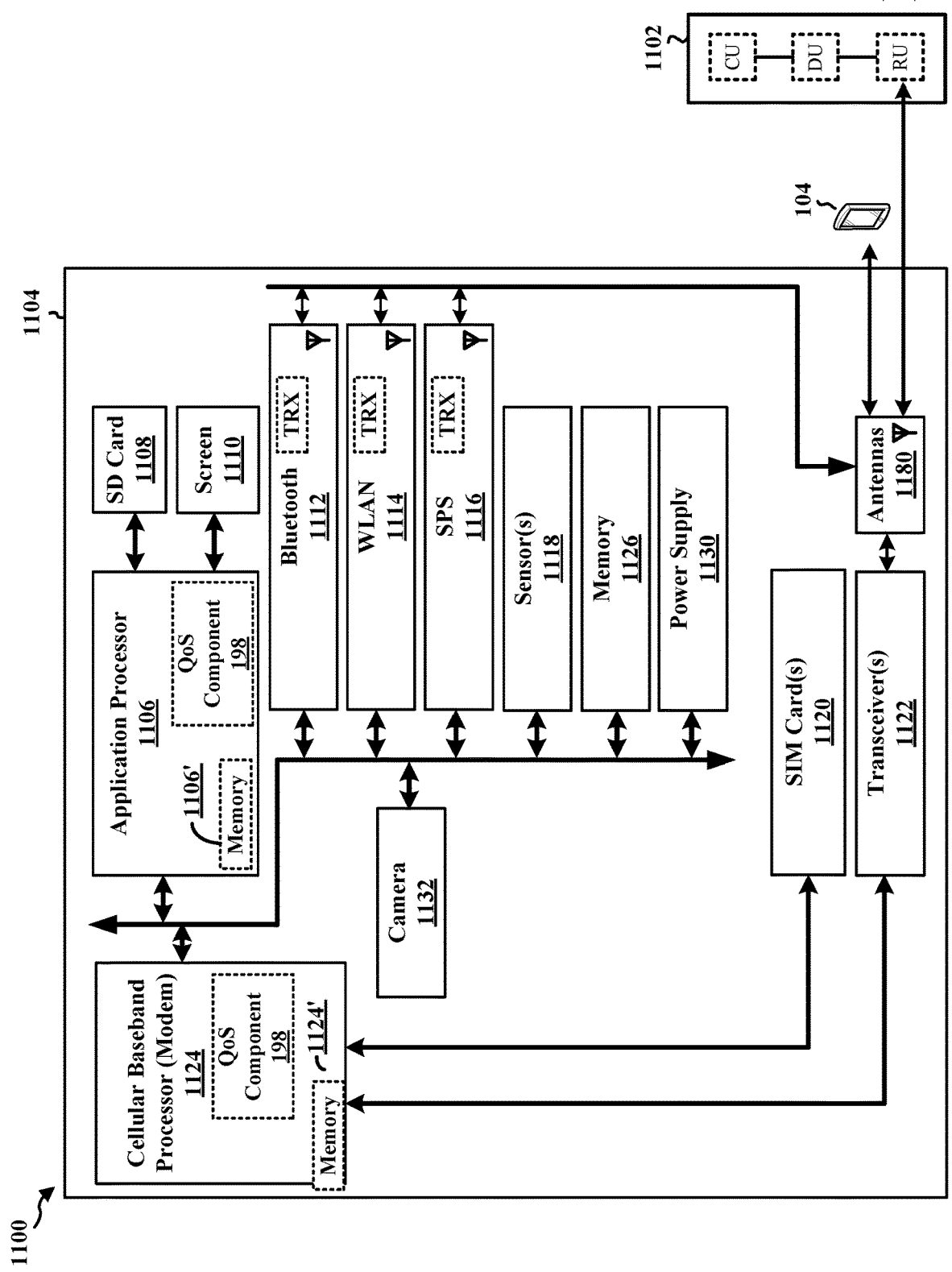
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, a satellite system module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the satellite system module 1116 may include an on-chip transceiver (TRX)/receiver (RX). The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described herein. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed herein, the QoS component 198 may be configured to establish a protocol data unit (PDU) session with a second device, the PDU session including a set of quality of service (QoS) flows, the set of QoS flows being associated with a set of data radio bearers (DRBs), each QoS flow in the set of QoS flows being associated with multiple QoS identifier parameters to provide different QoS to different packets within a single QoS flow. In some aspects, the QoS component 198 may be configured to establish a PDU session with a second device, the PDU session including a set of QoS flows, the set of QoS flows being associated with a set of DRBs, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the QoS component 198 may be configured to establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the QoS component 198 may be configured to communicate with the second device based on the set of QoS flows. The QoS component 198 may be within the cellular baseband processor 1124, the application processor 1106, or both the cellular baseband processor 1124 and the application processor 1106. The QoS component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for establishing a PDU session with a second device, the PDU session including a set of QoS flows, the set of QoS flows being associated with a set of DRBs, each QoS flow in the set of QoS flows being associated with multiple QoS identifier parameters to provide different QoS to different packets within a single QoS flow. In some aspects, the apparatus 1104 may include means for establishing a PDU session with a second device, the PDU session including a set of QoS flows, the set of QoS flows being associated with a set of DRBs, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the apparatus 1104 may include means for establishing a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the apparatus 1104 may include means for communicating with the second device based on the set of QoS flows. The means may be the QoS component 198 of the apparatus 1104 configured to perform the functions recited by the means. As described herein, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
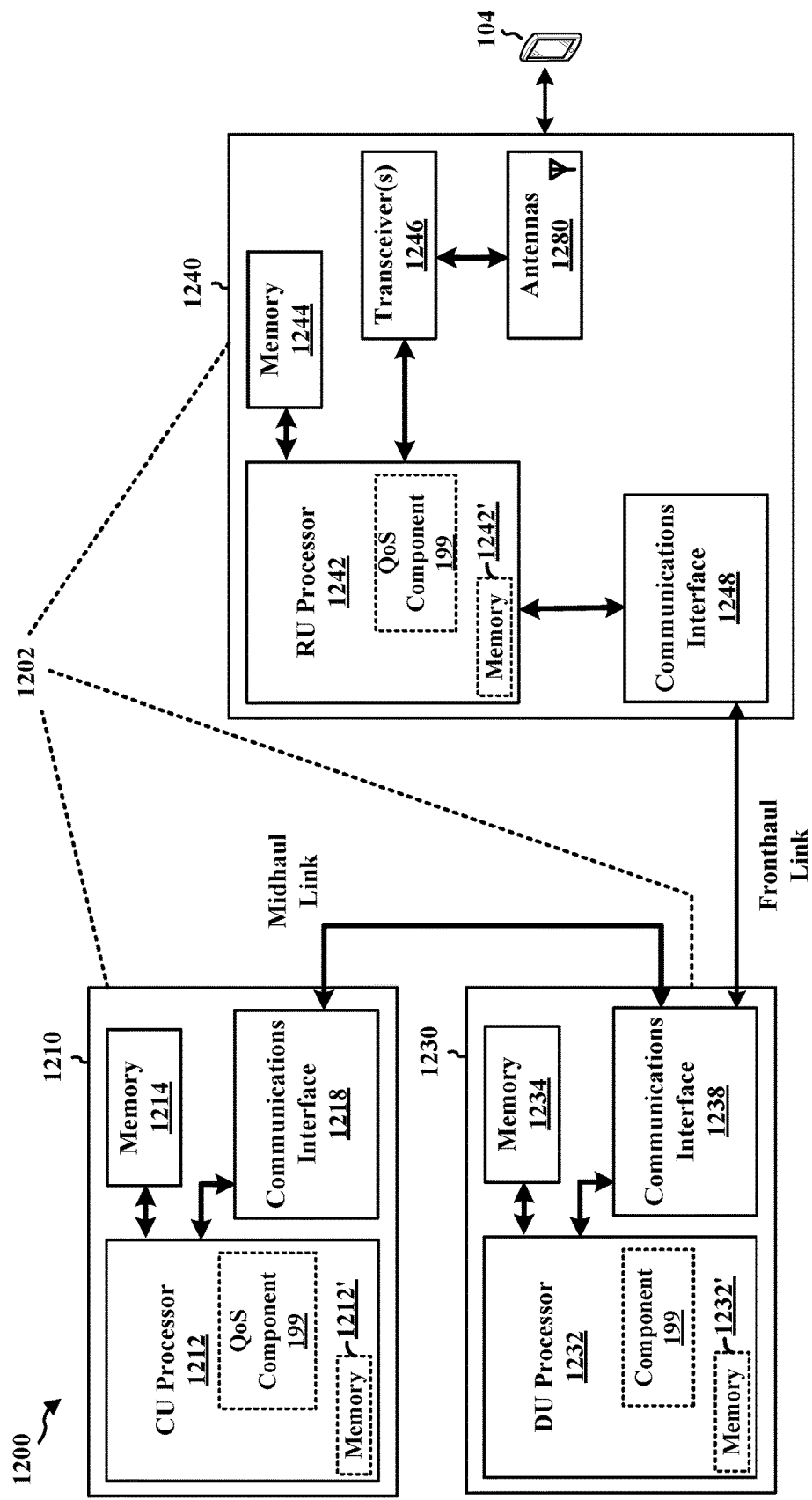
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the QoS component 199 is configured to establish a PDU session with a second device, the PDU session including a set of QoS flows, the set of QoS flows being associated with a set of DRBs, each QoS flow in the set of QoS flows being associated with multiple QoS identifier parameters to provide different QoS to different packets within a single QoS flow. In some aspects, the QoS component 199 may be configured to establish a PDU session with a second device, the PDU session including a set of QoS flows, the set of QoS flows being associated with a set of DRBs, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the QoS component 199 may be configured to establish a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the QoS component 199 may be configured to communicate with the second device based on the set of QoS flows. The QoS component 199 may be within one or more processors of one or more of the CU 1210, DU 1230, and the RU 1240. The QoS component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for establishing a PDU session with a second device, the PDU session including a set of QoS flows, the set of QoS flows being associated with a set of DRBs, each QoS flow in the set of QoS flows being associated with multiple QoS identifier parameters to provide different QoS to different packets within a single QoS flow. In some aspects, the network entity 1202 may include means for establishing a PDU session with a second device, the PDU session including a set of QoS flows, the set of QoS flows being associated with a set of DRB s, where one DRB in the set of DRBs is associated with a PDCP or a RLC and associated with a first set of one or more configuration parameters based on a first QoS identifier parameter and a second set of one or more configuration parameters based on a second QoS identifier parameter. In some aspects, the network entity 1202 may include means for establishing a PDU session with a second device, the PDU session including a set of QoS flows, the set of QoS flows being associated with a set of DRBs, each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows. In some aspects, the network entity 1202 may include means for communicating with the second device based on the set of QoS flows. The means may be the QoS component 199 of the network entity 1202 configured to perform the functions recited by the means. As described herein, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for communication at a first device, comprising: establishing a protocol data unit (PDU) session with a second device, the PDU session comprising a set of quality of service (QoS) flows, the set of QoS flows being associated with a set of data radio bearers (DRBs), each QoS flow in the set of QoS flows being associated with multiple QoS identifier parameters to provide different QoS to different packets within a single QoS flow; and communicating with the second device based on the set of QoS flows.

Aspect 2 is the method of aspect 1, where each DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter.

Aspect 3 is the method of any of aspects 1-2, where the first set of one or more configuration parameters comprises at least one of a discard timer, a reordering timer, a reassembly timer, a status timer, a control information update timer, or a poll retransmission timer that is different than the second set of one or more configuration parameters.

Aspect 4 is the method of any of aspects 1-3, where the single QoS flow with the multiple QoS identifier parameters is associated with multiple DRBs in the set of DRBs, where each QoS identifier parameter of the multiple QoS identifier parameters is supported by a corresponding DRB in the set of DRBs.

Aspect 5 is the method of any of aspects 1-4, where the single QoS flow with the multiple QoS identifier parameters is associated with a single DRB of the set of DRBs, the single DRB being associated with support for multiple configuration parameter set corresponding to each of the multiple QoS identifier parameters.

Aspect 6 is the method of any of aspects 1-5, where each packet associated with each QoS flow of the set of QoS flows is associated with one QoS identifier parameter of the multiple QoS identifier parameters based on at least one of a set of protocol contents or a set of traffic characteristics.

Aspect 7 is the method of any of aspects 1-6, where at least one of the set of traffic characteristics or a QoS identifier parameters is provided by an application or derived at the transceiver.

Aspect 8 is the method of any of aspects 1-7, where each packet associated with a QoS identifier parameter of the multiple QoS identifier parameters is routed to an associated DRB in the set of DRBs that supports the QoS identifier parameter, and where the first device is a user equipment (UE) and the second device is a base station.

Aspect 9 is the method of any of aspects 1-8, where each packet associated with a QoS identifier parameter of the multiple QoS identifier parameters is routed to an associated DRB in the set of DRBs that supports the QoS identifier parameter, where the second device is a user equipment (UE) and the first device is a base station.

Aspect 10 is a method for communication at a first device, comprising: establishing a protocol data unit (PDU) session with a second device, the PDU session comprising a set of quality of service (QoS) flows, the set of QoS flows being associated with a set of data radio bearers (DRBs), where one DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter; and communicating with the second device based on the set of QoS flows.

Aspect 11 is the method of aspect 10, where each QoS flow in the set of QoS flows is associated with multiple QoS identifier parameters.

Aspect 12 is the method of any of aspects 10-11, where the first set of one or more configuration parameters comprises at least one of a discard timer, a reordering timer, a reassembly timer, a status timer, a control information update timer, or a poll retransmission timer that is different than the second set of one or more configuration parameters.

Aspect 13 is the method of any of aspects 10-12, where each QoS flow in the set of QoS flows being associated with at least one QoS identifier parameters, and where at least one QoS flow in the set of QoS flows is associated with multiple DRBs in the set of DRBs, where each QoS identifier parameter of the at least one QoS identifier parameters is supported by a corresponding DRB in the set of DRBs.

Aspect 14 is the method of any of aspects 10-13, where each QoS flow in the set of QoS flows being associated with at least one QoS identifier parameters, and where at least one QoS flow in the set of QoS flows is associated with a single DRB of the set of DRBs, the single DRB being associated with support for multiple configuration parameter set corresponding to each of the at least one QoS identifier parameters.

Aspect 15 is the method of any of aspects 10-14, where each packet associated with each QoS flow of the set of QoS flows is associated with one QoS identifier parameter of the at least one QoS identifier parameters based on at least one of a set of protocol contents or a set of traffic characteristics.

Aspect 16 is the method of any of aspects 10-15, where at least one of the set of traffic characteristics or a QoS identifier parameters is provided by an application or derived at the transceiver.

Aspect 17 is the method of any of aspects 10-16, where each packet associated with a QoS identifier parameter of the at least one QoS identifier parameters is routed to an associated DRB in the set of DRBs that supports the QoS identifier parameter, and where the first device is a user equipment (UE) and the second device is a base station.

Aspect 18 is the method of any of aspects 10-17, where each packet associated with a QoS identifier parameter of the at least one QoS identifier parameters is routed to an associated DRB in the set of DRBs that supports the QoS identifier parameter, and where the second device is a user equipment (UE) and the first device is a base station.

Aspect 19 is a method for communication at a first device, comprising: establishing a protocol data unit (PDU) session with a second device, the PDU session comprising a set of quality of service (QoS) flows, the set of QoS flows being associated with a set of data radio bearers (DRBs), each QoS flow in the set of QoS flows being associated with at least one QoS identifier parameters, one QoS identifier parameter of the at least one QoS identifier parameters being associated with one or more DRBs in the set of DRBs based on an inter-packet association and one QoS flow of the set of QoS flows; and communicating with the second device based on the set of QoS flows.

Aspect 20 is the method of aspect 19, where each DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter.

Aspect 21 is the method of any of aspects 19-20, where the first set of one or more configuration parameters comprises at least one of a discard timer, a reordering timer, a reassembly timer, a status timer, a control information update timer, or a poll retransmission timer that is different than the second set of one or more configuration parameters.

Aspect 22 is the method of any of aspects 19-21, where each QoS flow in the set of QoS flows is associated with multiple QoS identifier parameters.

Aspect 23 is the method of any of aspects 19-22, where each packet associated with each QoS flow of the set of QoS flows is associated with a single QoS identifier parameter of the multiple QoS identifier parameters based on at least one of a set of protocol contents or a set of traffic characteristics.

Aspect 24 is the method of any of aspects 19-23, where at least one of the set of traffic characteristics or a QoS identifier parameters is provided by an application or derived at the transceiver.

Aspect 25 is the method of any of aspects 19-24, where each packet associated with a QoS identifier parameter of the at least one QoS identifier parameters is routed to an associated DRB in the set of DRBs that supports the QoS identifier parameter, and where the first device is a user equipment (UE) and the second device is a base station.

Aspect 26 is the method of any of aspects 19-25, where each packet associated with a QoS identifier parameter of the at least one QoS identifier parameters is routed to an associated DRB in the set of DRBs that supports the QoS identifier parameter, and where the second device is a user equipment (UE) and the first device is a base station.

Aspect 27 is an apparatus for wireless communication at a network entity including a memory and at least one processor coupled to the memory and, based at least in part on information stored in the memory, configured to perform a method in accordance with any of aspects 1-9. The apparatus may include at least one of a transceiver or an antenna coupled to the at least one processor.

Aspect 28 is an apparatus for wireless communication, including means for performing a method in accordance with any of aspects 1-9.

In aspect 29, the apparatus of aspect 27 or 28 further includes at least one of a transceiver or an antenna.

Aspect 30 is a non-transitory computer-readable medium including instructions that, when executed by an apparatus, cause the apparatus to perform a method in accordance with any of aspects 1-9.

Aspect 31 is an apparatus for wireless communication at a network entity including a memory and at least one processor coupled to the memory and, based at least in part on information stored in the memory, configured to perform a method in accordance with any of aspects 10-18. The apparatus may include at least one of a transceiver or an antenna coupled to the at least one processor.

Aspect 32 is an apparatus for wireless communication, including means for performing a method in accordance with any of aspects 10-18.

In aspect 33, the apparatus of aspect 31 or 32 further includes at least one of a transceiver or an antenna.

Aspect 34 is a non-transitory computer-readable medium including instructions that, when executed by an apparatus, cause the apparatus to perform a method in accordance with any of aspects 10-18.

Aspect 35 is an apparatus for wireless communication at a network entity including a memory and at least one processor coupled to the memory and, based at least in part on information stored in the memory, configured to perform a method in accordance with any of aspects 19-26. The apparatus may include at least one of a transceiver or an antenna coupled to the at least one processor.

Aspect 36 is an apparatus for wireless communication, including means for performing a method in accordance with any of aspects 19-26.

In aspect 37, the apparatus of aspect 35 or 36 further includes at least one of a transceiver or an antenna.

Aspect 38 is a non-transitory computer-readable medium including instructions that, when executed by an apparatus, cause the apparatus to perform a method in accordance with any of aspects 19-26.

What is claimed is:

1. An apparatus for communication at a first device, comprising:
    memory; and
    at least one processor coupled to the memory and, based at least in part on information stored in the memory, the at least one processor is configured to:
        establish a protocol data unit (PDU) session with a second device, the PDU session comprising a set of quality of service (QOS) flows, the set of QoS flows being associated with a set of data radio bearers (DRBs), each respective QoS flow in the set of QoS flows being associated with multiple QoS identifier parameters to provide different QoS to different packets within the respective QoS flow, wherein one or more parameter types associated with the multiple QoS identifier parameters that are associated with respective QoS flows are based on a respective expected traffic pattern associated with each respective QoS flow, and wherein the respective expected traffic pattern comprises an application data size in a number of application data units (ADUs) or statistics representative of an application synchronized to network time; and
        communicate with the second device based on the set of QoS flows.

2. The apparatus of claim 1, wherein each DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter.

3. The apparatus of claim 2, wherein the first set of one or more configuration parameters comprises at least one of a discard timer, a reordering timer, a reassembly timer, a status timer, a control information update timer, or a poll retransmission timer that is different than the second set of one or more configuration parameters.

4. The apparatus of claim 1, wherein the respective QoS flow with the multiple QoS identifier parameters is associated with multiple DRBs in the set of DRBs, wherein each QoS identifier parameter of the multiple QoS identifier parameters is supported by a corresponding DRB in the set of DRBs.

5. The apparatus of claim 1, wherein the respective QOS flow with the multiple QoS identifier parameters is associated with a single DRB of the set of DRBs, the single DRB being associated with support for multiple configuration parameter set corresponding to each of the multiple QoS identifier parameters.

6. The apparatus of claim 1, wherein each packet associated with each QoS flow of the set of QoS flows is associated with one QoS identifier parameter of the multiple QoS identifier parameters based on at least one of a set of protocol contents or a set of traffic characteristics.

7. The apparatus of claim 6, further comprising at least one of a transceiver or an antenna coupled to the at least one processor configured to communicate with the second device, wherein at least one of the set of traffic characteristics or a QoS identifier parameters is provided by the application or derived at the transceiver.

8. The apparatus of claim 1, wherein each packet associated with a QoS identifier parameter of the multiple QoS identifier parameters is routed to an associated DRB in the set of DRBs that supports the QoS identifier parameter, and wherein the first device is a user equipment (UE) and the second device is a base station.

9. The apparatus of claim 1, wherein each packet associated with a QoS identifier parameter of the multiple QoS identifier parameters is routed to an associated DRB in the set of DRBs that supports the QoS identifier parameter, wherein the second device is a user equipment (UE) and the first device is a base station.

10. An apparatus for communication at a first device, comprising:
    memory; and
    at least one processor coupled to the memory and, based at least in part on information stored in the memory, the at least one processor is configured to:
        establish a protocol data unit (PDU) session with a second device, the PDU session comprising a set of quality of service (QOS) flows, the set of QoS flows being associated with a set of data radio bearers (DRBs), wherein one DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter, wherein each respective QoS flow in the set of QoS flows is associated with multiple QoS identifier parameters, wherein one or more parameter types associated with the multiple QoS identifier parameters that are associated with respective QoS flows are based on a respective expected traffic pattern associated with each respective QoS flow, and wherein the respective expected traffic pattern comprises an application data size in a number of application data units (ADUs) or statistics representative of an application synchronized to network time; and
        communicate with the second device based on the set of QoS flows.

11. The apparatus of claim 10, wherein the first set of one or more configuration parameters comprises at least one of a discard timer, a reordering timer, a reassembly timer, a status timer, a control information update timer, or a poll retransmission timer that is different than the second set of one or more configuration parameters.

12. The apparatus of claim 10, wherein each QoS flow in the set of QoS flows being associated with at least one QoS identifier parameters, and wherein at least one QoS flow in the set of QoS flows is associated with multiple DRBs in the set of DRBs, wherein each QoS identifier parameter of the at least one QoS identifier parameters is supported by a corresponding DRB in the set of DRBs.

13. The apparatus of claim 10, wherein each QoS flow in the set of QoS flows being associated with at least one QoS identifier parameters, and wherein at least one QoS flow in the set of QoS flows is associated with a single DRB of the set of DRBs, the single DRB being associated with support for multiple configuration parameter set corresponding to each of the at least one QoS identifier parameters.

14. The apparatus of claim 10, wherein each packet associated with each QoS flow of the set of QoS flows is associated with one QoS identifier parameter of the at least one QoS identifier parameters based on at least one of a set of protocol contents or a set of traffic characteristics.

15. The apparatus of claim 14, further comprising at least one of a transceiver or an antenna coupled to the at least one processor configured to communicate with the second device, wherein at least one of the set of traffic characteristics or a QoS identifier parameters is provided by the application or derived at the transceiver.

16. The apparatus of claim 10, wherein each packet associated with a QoS identifier parameter of the at least one QoS identifier parameters is routed to an associated DRB in the set of DRBs that supports the QoS identifier parameter, and wherein the first device is a user equipment (UE) and the second device is a base station.

17. The apparatus of claim 10, wherein each packet associated with a QoS identifier parameter of the at least one QoS identifier parameters is routed to an associated DRB in the set of DRBs that supports the QoS identifier parameter, and wherein the second device is a user equipment (UE) and the first device is a base station.

18. A method for communication at a first device, comprising:
establishing a protocol data unit (PDU) session with a second device, the PDU session comprising a set of quality of service (QOS) flows, the set of QoS flows being associated with a set of data radio bearers (DRBs), each respective QoS flow in the set of QoS flows being associated with multiple QoS identifier parameters to provide different QoS to different packets within the respective QoS flow, wherein one or more parameter types associated with the multiple QoS identifier parameters that are associated with respective QoS flows are based on a respective expected traffic pattern associated with each respective QoS flow, and wherein the respective expected traffic pattern comprises an application data size in a number of application data units (ADUs) or statistics representative of an application synchronized to network time; and
communicating with the second device based on the set of QoS flows.

19. The method of claim 18, wherein each DRB in the set of DRBs is associated with a packet data convergence protocol (PDCP) or a radio link protocol (RLC) and associated with a first set of one or more configuration parameters based on a first QoS identifier parameter and a second set of one or more configuration parameters based on a second QoS identifier parameter.

20. The method of claim 19, wherein the first set of one or more configuration parameters comprises at least one of a discard timer, a reordering timer, a reassembly timer, a status timer, a control information update timer, or a poll retransmission timer that is different than the second set of one or more configuration parameters.

21. The method of claim 18, wherein the respective QoS flow with the multiple QoS identifier parameters is associated with multiple DRBs in the set of DRBs, wherein each QoS identifier parameter of the multiple QoS identifier parameters is supported by a corresponding DRB in the set of DRBs.

* * * * *